(12) United States Patent
Murphy et al.

(10) Patent No.: US 8,315,595 B2
(45) Date of Patent: Nov. 20, 2012

(54) PROVIDING TRUSTED COMMUNICATION

(75) Inventors: Grant C. Murphy, Southport (AU); Kai Gorman, Cleveland (AU)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 12/481,914

(22) Filed: Jun. 10, 2009

(65) Prior Publication Data

US 2010/0317319 A1    Dec. 16, 2010

(51) Int. Cl.
H04M 3/42 (2006.01)
H04M 1/68 (2006.01)
(52) U.S. Cl. .................. 455/410; 455/415; 455/417
(58) Field of Classification Search ...... 726/1; 709/206, 709/229; 455/414.1, 415, 417, 410, 411, 455/565; 379/142.05
See application file for complete search history.

(56) References Cited

U.S. PATENT DOCUMENTS

| | | | |
|---|---|---|---|
| 6,266,692 | B1 | 7/2001 | Greenstein |
| 7,630,986 | B1 * | 12/2009 | Herz et al. ............... 1/1 |
| 7,797,379 | B2 * | 9/2010 | Hawkins ............... 709/203 |
| 7,886,334 | B1 * | 2/2011 | Walsh et al. ............ 726/1 |
| 2003/0196116 | A1 | 10/2003 | Troutman |
| 2003/0212791 | A1 | 11/2003 | Pickup |
| 2005/0094788 | A1 * | 5/2005 | Lipton et al. ........... 379/142.01 |
| 2005/0216587 | A1 | 9/2005 | John |
| 2005/0246420 | A1 | 11/2005 | Little, II |
| 2006/0168022 | A1 * | 7/2006 | Levin et al. ............. 709/206 |
| 2007/0033256 | A1 * | 2/2007 | Ben-Itzhak ............. 709/206 |
| 2008/0226047 | A1 * | 9/2008 | Reumann et al. ....... 379/142.04 |
| 2009/0083826 | A1 * | 3/2009 | Baribault ............... 726/1 |
| 2010/0173611 | A1 * | 7/2010 | Choi ..................... 455/411 |
| 2010/0202439 | A1 * | 8/2010 | Rosenberg et al. ..... 370/352 |
| 2010/0222028 | A1 * | 9/2010 | Gisby et al. ............ 455/412.2 |
| 2011/0128906 | A1 * | 6/2011 | Arrasvuori et al. ..... 370/328 |

\* cited by examiner

*Primary Examiner* — Kent Chang
*Assistant Examiner* — Nelson Rosario
(74) *Attorney, Agent, or Firm* — Jeffrey S. LaBaw (57) ABSTRACT

Electronic communication is susceptible to SPAM, phishing attacks, and other unwanted communications because of a recipient's limited control over communication transmitted by a sender. Functionality can be implemented to employ a multi-level approach to establishing trust between a sender and a recipient prior to transmitting any communication to prevent unwanted content from being transmitted to a recipient. Initial levels of trust may be established by requiring the sender to provide trust establishment information about the recipient. Based on the validity and percent accuracy of the provided trust establishment information, the communication may be discarded or transmitted to the recipient. A final level of trust depends on the approval of a trust validation request sent to the recipient on behalf of the sender. Such a system configured to provide trusted communication can reduce the probability of the recipient receiving large scale SPAM, phishing attacks, telemarketing calls, and other unwanted communication.

19 Claims, 7 Drawing Sheets

PROVIDING TRUSTED COMMUNICATION

BACKGROUND

Embodiments of the inventive subject matter generally relate to the field of electronic communication, and more particularly, to techniques for providing trusted communication.

Electronic communication is widely susceptible to SPAM, phishing attacks, and other unwanted communications. This is because recipients have limited control over who can contact them and virtually no control over the subject/content of the communication transmitted by senders. Techniques for controlling unwanted email messages include configuring an email server to discard email messages containing predefined keywords, maintaining a white list such that email messages from senders on the white list are delivered to an inbox, and social networking based email filtering based on an establishment of friendship. However, the aforementioned techniques may inadvertently block messages from a trusted sender and/or may be bypassed by a sender transmitting unwanted email messages.

SUMMARY

Embodiments include a method comprising receiving a communication request from a sender. The communication request comprises trust establishment information and precedes a communication between the sender and a recipient. The communication is stored in a communication repository and it is determined that a trust relationship between the sender and the recipient is not indicated in a trust relationship map. The trust relationship map indicates trust relationships between a plurality of senders and recipients whose communications pass through a communications server. The trust establishment information in the communication request is compared with a stored set of trust information configured by the recipient. It is determined that the trust establishment information in the communication request is correct. A trust validation request is transmitted to the recipient to determine whether to send the stored communication to the recipient. The trust validation request can indicate die trust establishment information in the communication request.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments maybe practiced without these specific details. For instance, although examples refer to communication between mobile phones, examples may also refer to various other forms of communication such as instant messaging, voice over Internet Protocol (VOIP) communication, communication between paging systems, etc. In other instances, well-known instruction instances, protocols, structures, and techniques have not been shown in detail in order not to obfuscate the description.

It is not uncommon to receive communications such as text messages, telemarketing calls via mobile phones, landline phones, and VOIP from unknown senders. A multi-level approach to establishing trust between a sender and a recipient prior to transmitting any communication can prevent unwanted content from being transmitted to a recipient. Such a multi-level approach to establishing trust between a sender and a recipient can also reduce the possibility of transmitting unwanted communication via a trust validation request (or a friendship request). A first level of trust may be established by requiring the sender to provide trust establishment information about the recipient. Based on a set of stored trust information and trust policies configured by the recipient, the validity and percent accuracy of the provided trust establishment information may be determined. The trust policies may be used to determine whether to discard communication from the sender or proceed to the next level of trust establishment. Subsequent levels of trust may be enforced by requiring the sender to provide additional information about the recipient. A final level of trust depends on the approval of a trust validation request sent to the recipient on behalf of the sender. Such a system configured to provide trusted communication to the recipient can reduce the probability of the recipient receiving large scale SPAM, phishing attacks, telemarketing calls, and other unwanted communication.

Figure 1:
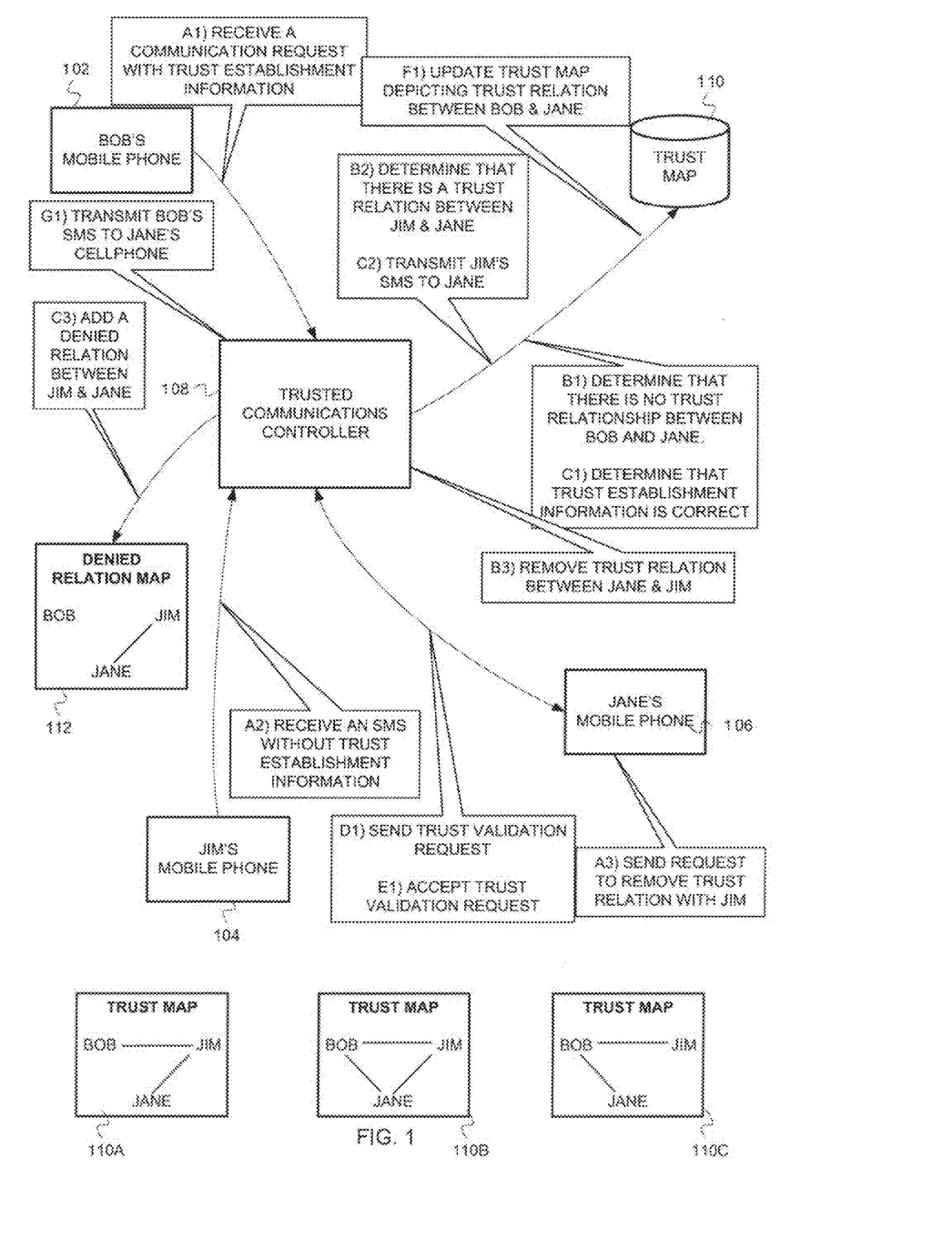
FIG. 1 is a conceptual diagram illustrating an example configuration of trust relations between users.

FIG. 1 is an example conceptual diagram illustrating a configuration of trust relations between users. FIG. 1 depicts a trusted communications controller 108 configured to provide trusted messages to users in a mobile phone environment. In FIG. 1, three users—Bob, Jim, and Jane communicate using short messaging services (SMS) via the trusted communications controller 108.

At stage A1, the trusted communications controller 108 receives a communication request, intended for Jane's mobile phone 106, from Bob's mobile phone 102. The trusted communications controller 108 also receives trust establishment information as part of the communication request. The communication request may contain information about Bob (e.g., Bob's mobile phone number, Bob's full name, etc.). In some implementations, the communication request may be transmitted as part of a communication. For example, the communication may be an SMS and the communication request containing the trust establishment information may be transmitted as a part of the SMS header.

At stage B1, the trusted communications controller 108 accesses a trust map 110 (see trust map 110A) and determines that there is no trust relationship between Bob and Jane. At stage C1, the trusted communications controller 108 retrieves the trust establishment information from the communication request and compares it with a stored set of trust information (not shown) configured by Jane. The trusted communications controller 108 determines that the trust establishment information in the communication request is correct.

At stage D1, the trusted communications controller 108 sends a trust validation request to Jane's mobile phone 106. The trust validation request may indicate Bob's name, Bob's mobile phone number, trust establishment information provided by Bob, etc. The trust validation request allows Jane to reject a trust relationship with Bob irrespective of the accuracy of the trust establishment information provided by Bob. At stage E1, the trusted communications controller 108 receives an indication, from Jane's mobile phone 106, accepting the trust validation request.

At stage F1, the trusted communications controller 108 updates the trust map 110B and indicates a trust relationship between Jane and Bob. At stage G1, the trusted communications controller 108 transmits the SMS received from Bob's mobile phone 102 to Jane's mobile phone 106.

At stage A2, the trusted communications controller 108 receives an SMS, intended for Jane's mobile phone 106 from Jim's mobile phone 104. The SMS received from mobile phone 104 does not contain any trust establishment information. At stage B2, the trusted communications controller 108 accesses the trust map 110B and determines that there is a trust relationship between Jim and Jane. Therefore, at stage C2, the trusted communications controller 108 transmits the SMS received from Jim's mobile phone 104 to Jane's mobile phone 106.

At stage A3, the trusted communications controller 108 receives a request from Jane's mobile phone 106 indicating the trust relation with Jim's mobile phone 104 should be removed. At stage B3, the trusted communications controller 108 accesses the trust map 110 and removes a trust relation between Jim and Jane. Trust map 110C represents an updated trust map without the trust relation between Jim and Jane. At stage C3, the trusted communications controller 108 updates a denied relation map 112 and adds a denied relation between Jim and Jane. When the trusted communications controller 108 receives an SMS from Jim's mobile phone 104 intended for Jane's mobile phone 106, the trusted communications controller 108 will discard the SMS, without generating a trust validation request or validating received trust establishment information, in accordance with the denied relation map 112.

Figure 2:
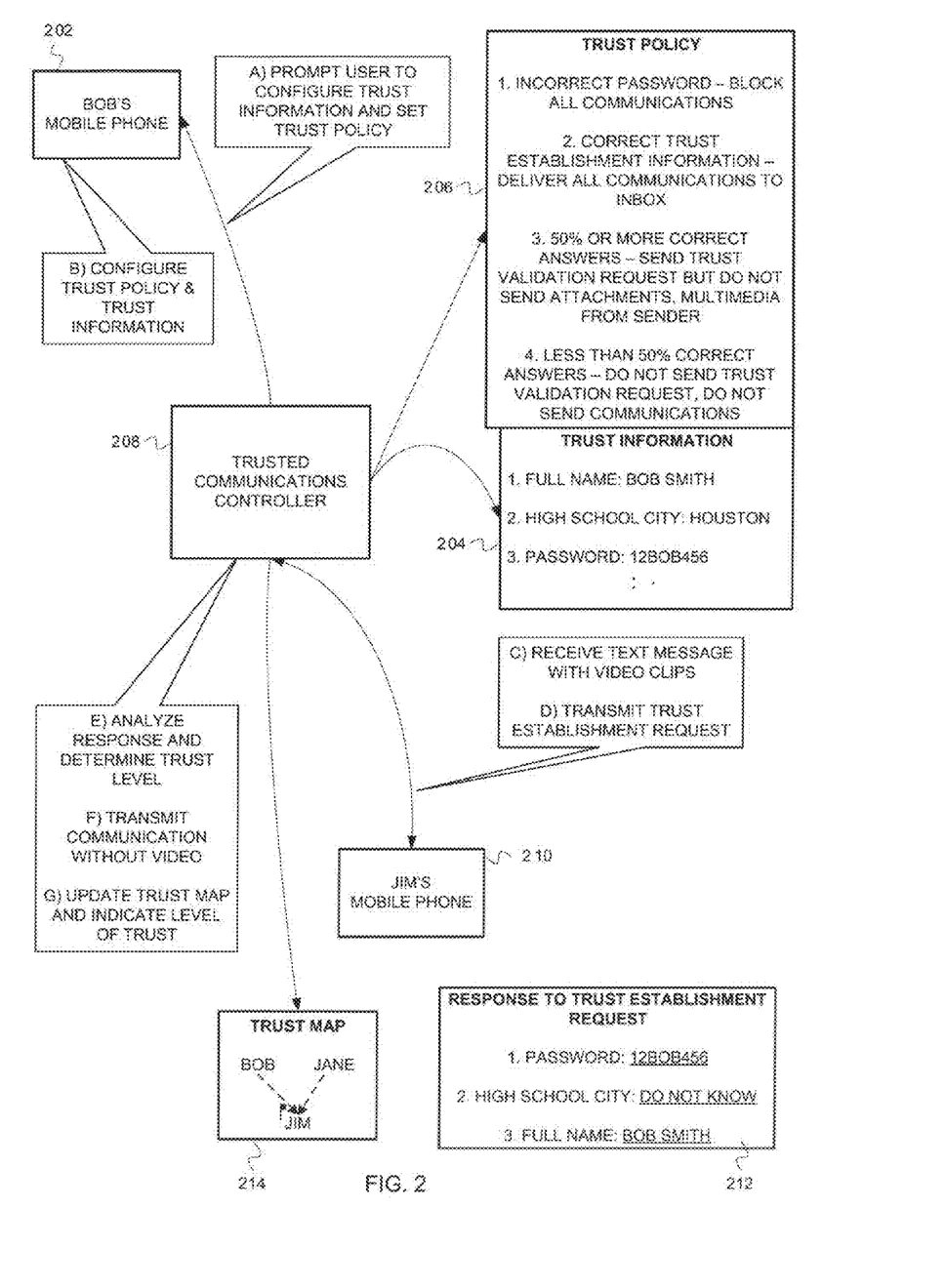
FIG. 2 is an example conceptual diagram illustrating configuration and implementation of trust information and trust policy.

FIG. 2 is an example conceptual diagram illustrating configuration and implementation of trust information and trust policy. FIG. 2 depicts a trusted communications controller 208

At stage A, the trusted communications controller 208 prompts Bob to configure trust information 204 and trust policy 206. At stage B, Bob configures the trust information 204 and trust policy 206. Bob may use a mobile phone 202 to configure the trust information 204 and trust policy 206. Alternately, Bob may also use an Internet-based application to configure the trust information 204 and the trust policy 206. Bob may upload the trust information 204 and the trust policy 206 to one or more of the trusted communications controller 208 at a mobile phone base station (not shown), a trusted communications controller plug-in on the mobile phone 202, etc.

The trust information 204 can include personal information, secret codes (e.g., passwords), and other details about Bob. As shown in FIG. 2, the trust information includes Bob's name, a city where Bob went to high school, and a password. The trust policy can be used to assign different levels of access based on trust establishment information provided, trust questions answered, etc. For example, the trust policy 206 in FIG. 2 dictates that if 50% of the trust establishment information provided by the sender is incorrect, the sender should be added to a denied relation map, a trust validation request should not be sent, and any communications from the sender should be discarded. As another example, the trust policy 206 also dictates that if all the trust establishment information provided in a communication request is correct, the communication may be directly transmitted without transmitting a trust validation request to the recipient. In some embodiments, hierarchical trust levels may be implemented based on the trust policy 206. For example, if a sender provides incorrect trust establishment information, the sender may be allowed another opportunity to transmit trust establishment information.

A recipient may be able to associate a different level of trust with each sender based on the trust establishment information in the communication request and the trust policy. For example, the recipient may set a permissive level of trust by accepting communications from any sender who knows the recipient's full name. As another example, the recipient may set a restrictive trust level by accepting communications from senders who know a secret password. In one implementation, the trust policy may be configured such that the communication is discarded if the communication request does not include trust establishment information. In another implementation, if the communication request does not contain trust establishment information, a trust establishment request may be transmitted to the sender. In another implementation, the trust establishment request may be transmitted irrespective of whether the trust establishment information is received. The trust establishment request may include a request for information other than the trust establishment information received as part of the communication request.

At stage C, the trusted communications controller 208 receives a text message with video clips from Jim's mobile phone 210. The trusted communications controller 208 determines that the text message does not include trust establishment information (e.g., in a header, as part of a communication request, etc). Therefore, at stage D, the trusted communications controller 208 transmits a trust establishment request to Jim's mobile phone 210. Jim transmits a response to the trust establishment request 212 to the trusted communications controller 208.

At stage E, the trusted communications controller 208 accesses the trust information 204 and analyses the received response 212. The trusted communications controller 208 determines that two of the three responses are correct and that one of the correct responses is the password. The trusted communications controller 208 also determines that although not every one of the responses was correct, more than 50% of the responses were correct. Therefore, in accordance with the trust policy 206, the trusted communications controller 208 removes the video clips from the communications and only transmits the text communication to Bob's mobile phone 202 (see stage F). Additionally, the trusted communications controller 208 can also generate and transmit a trust validation request to Bob's mobile phone 202. The trusted communications controller 208 can transmit the received communication sans the video clips after Bob accepts the trust validation request.

At stage G, the trusted communications controller 208 updates a trust map 214, indicates a trust relation between Bob and Jim, and denotes a level of trust associated with Jim. For example, the trust map 214 of FIG. 2 depicts a flag associated with Jim in the trust map. The flag indicates, to the trusted communications controller 208, that attachments or multimedia content in communications received from Jim should be discarded. The trusted communications controller 208 can maintain and execute different levels of trust for each sender and recipient in the trust map. For example, Jim may be completely trusted by another recipient (e.g., Jane) in the trust map 214. The trusted communications controller 208 can distinguish between the different recipients and accordingly transmit communications based on each recipient's trust policy. Therefore, if Jim sends a second communication, with a video clip, to Bob and Jane, the trusted communications controller 208 would transmit the second communication to Bob without the video clip. The trusted communications controller 208 would transmit the same second communication to Jane with the video clip.

Although FIGS. 1-2 describe operations for transmitting mobile phone messages (e.g., SMS, MMS, etc.) between trusted mobile phones, the operations may be extended to other forms of communication. For example, the operations described by FIGS. 1-2 may also be implemented by instant messaging applications. Operations for requesting trust establishment information, generating a trust validation request, and transmitting communications based on the trust information and trust policy may also be implemented for voice communication (e.g., VOIP communication, voice communication via mobile phones, etc.)

Figure 3:
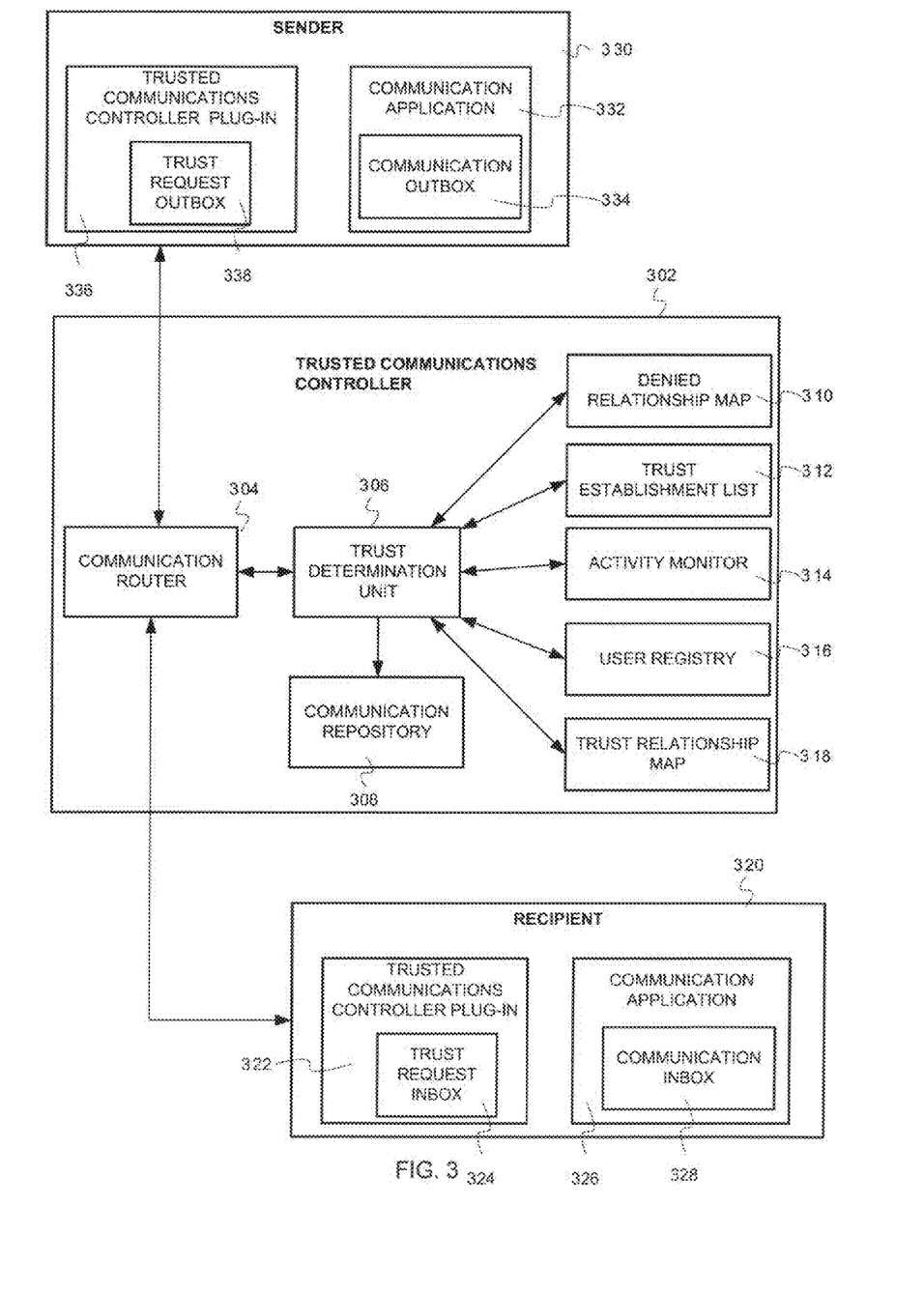
FIG. 3 is an example block diagram illustrating a system configured to implement trusted messaging between a sender and a recipient.

FIG. 3 is an example block diagram illustrating a system configured to implement trusted messaging between a sender and a recipient. FIG. 3 comprises a sender 330 in communication with a recipient 320 via a trusted communications controller 302. The sender 330 comprises a trusted communications controller plug-in 336 with a trust request outbox 338. The sender 330 also comprises a communication application 332 with a communication outbox 334. The recipient 320 comprises a trusted communications controller plug-in 322 with a trust request inbox 324. The recipient 320 also comprises a communication application 326 with a communication inbox 328. The trusted communications controller 302 comprises a trust determination unit 306 coupled with a denied relationship map 310, a trust establishment list 312, an activity monitor 314, a user registry 316, a trust relationship map 318, a communication repository 308, and a communication router 304. The communication router 304 is coupled to the sender 330 and the recipient 320. The communication router 304 receives communications from the sender 330 and transmits the communications to the recipient 320 after trust verification. For example, the communication router 304 may receive, using wireless communication or wireline communication, a voice signal from the sender 330. The communication router 304 may retrieve a voice packet and a header from the voice signal and transmit the voice packet and the header to the trust determination unit 306 for further analysis. As another example, the communication router 304 may transmit validated communications to the sender via a communication network (e.g., a wireless communication channel, a PSTN network, etc.).

The sender 330 sends communications (e.g., voice communications, text messages, paging messages, etc.) to the recipient 320. The trusted communications controller plug-in 336 allows the sender 330 to initiate a trust relationship with the recipient 320. The communication to be transmitted to the recipient 320 is stored in the communication outbox 334. The trusted communications controller plug-in 336 may retrieve the communication from the communication outbox 334 and notify the sender 330 that trust establishment information about the recipient 320 should be provided. On receiving the trust establishment information, the trusted communications controller plug-in 336 can append the trust establishment information to the communication and transmit the communication to the trusted communications controller 302. Alternately, the trusted communications controller plug-in 336 may generate a communication request containing trust establishment information, store the communication request in the trust request outbox 338, and transmit the communication request to the trusted communications controller 302 after the recipient 320 connects to the trusted communications controller 302. The trusted communications controller plug-in 336 may retrieve and transmit the communication in the communication outbox 334 after the recipient 320 approves the sender's trust validation request.

The trusted communications controller plug-in 336 may also maintain a local trust list of recipients with whom the sender 330 has a trust relationship. If the trusted communications controller plug-in 336 determines that the recipient 320 is part of the local trust list, the trusted communications controller plug-in 336 may not transmit the trust establishment information. Alternatively, the trusted communications controller plug-in 336 could include the trust establishment information with every communication. The trusted communications controller 302 could discard the trust establishment information if trust between the sender 330 and the recipient 320 has already been established. In another embodiment, the trusted communications controller plug-in 336 may transmit a communication from the communication outbox 334 without transmitting any trust establishment information. The trusted communications controller plug-in 336 could receive a trust establishment request from the trusted communications controller 302 and prompt the sender to complete the trust establishment request.

The trusted communications controller 302 manages trust relations and routes communications to the recipient 320 in accordance with the trust relations. The trusted communications controller 302 implements functionality to establish and maintain trust between the sender 330 and the recipient 320. The trusted communications controller 302 also manages trust revocation initiated by the recipient 330, manages trust information and trust policy, and accepts or discards communications based on the trust policy. The trusted communications controller 302 may also notify, via its communication router 304, the sender 330 when trust has been established, denied, or revoked.

The trusted communications controller 302 may support different types of communications such as email, SMS, instant messages, paging messages, VOIP communications, mobile phone voice communication, etc. The trusted communications controller 302 may comprise one or more communication routers 304 for each type of communications. For example, the trusted communications controller 302 may comprise a first communication router to facilitate voice communications between mobile phones, a second communication router to facilitate instant messaging communications, and so on.

The trust determination unit 306 in the trusted communications controller 302 coordinates interactions between other components in the trusted communications controller 302. The trust determination unit 306 receives a communication request containing trust establishment information, about the recipient 320, from the sender 330. The communication request may precede actual communication between the sender 330 and the recipient 320. In some implementations, the communication request and/or actual communication received from the sender 330 may not contain any trust establishment information. In such a scenario, the trust determination unit 306 can access the recipient's stored trust information in the user registry 316 and generate a trust establishment request based on the recipient's stored trust information. The trust determination unit 306 transmits the trust establishment request, via the communication router 304, to the sender 330 to verify the sender's credentials and determine the sender's level of trust with the recipient 320.

The trust determination unit 306 verifies the trust establishment information provided by the sender 330 by comparing the trust establishment information with a stored set of trust information stored in the user registry 316. The trust determination unit 306 also associates a trust level with the sender 330 based on the accuracy of the provided trust establishment information. The user registry 316 stores a list of users (i.e., senders and recipients) being serviced by the trusted communications controller 302. Each user in the user registry 316 may be identified by a username, a user identifier, a communication address (e.g., a mobile phone number). The user registry 316 also stores trust information (e.g., personal details such as a home address, a trust establishment password, etc.) configured by each of the recipients. Additionally, the recipients may also configure a trust policy to determine a trust level, which may be associated with the senders. For example, the recipient 320 may configure the trust policy to assign a low level of trust to a sender providing trust establishment information with 50% accuracy. As another example, the recipient may configure a trust policy dictating that attachments, images, and multimedia in communications from senders with a low level of trust should be discarded. Based on the recipient's trust policy in the user registry 316, the trust determination unit 306 determines whether a trust validation request should be sent to the recipient 320. The trust determination unit 306 generates a trust validation request and directs the communication router 304 to transmit the trust validation request to the recipient 320.

The trust determination unit 306 also stores a list of outstanding trust validation requests, which are to be confirmed by the recipients, in the trust establishment list 312. The trust determination unit 306 also stores the actual communication (e.g., text message) in the communication repository 308. The actual communication transmitted by the sender 330 is not included in the trust validation request to protect the recipient 320 from potential spam, profanity, and other unwanted content. The trust determination unit 306 may also indicate, in the trust establishment list 312, that a trust validation request has been sent to the recipient 320.

If the recipient 320 accepts the trust validation request and confirms that he trusts the sender 330, the trust determination unit 306 transmits the actual communication to the recipient 320 via the communication router 304. The trust determination unit 306 also adds a trust relationship to the trusted relationship map 318. The trust relationship map 318 is a many-to-many mapping of communication senders to communication recipients representing the trusted relationships that have been established. The trust determination unit 306 decides whether future communications from the sender 330 should be transmitted to the recipient 320 based on the trust relationship map 318. The trust determination unit 306 adds a new mapping in the trust relationship map 318 when the recipient 320 accepts a new trust relation and removes mappings when the recipient 320 revokes a trust relation If the recipient 320 rejects the trust validation request, the trust determination unit 306 deletes the communication and adds a denied relationship between the sender 330 and the recipient 320 to the denied relationship map 310. The trust determination unit 306 also directs the communication router 304 to inform the sender 330 of the denied trust validation request. The denied relationship map 310 is a many-to-many mapping of communication senders to communication recipients representing unsuccessful trust establishment attempts. The trust determination unit 306 decides whether future communications from the sender 330 should be discarded, based on information in the denied relationship map 310. The denied relationship map 310 can help prevent multiple trust validation requests from being sent to the same recipient 320 by the same sender 330, as this represents a type of spam.

The trust determination unit 306 also enforces policy relating to suspicious activity based on communications recorded by the activity monitor 314. The activity monitor 314 monitors incoming communication, trust validation requests from senders, recipients' response to the trust validation requests, etc. The activity monitor 314 records communications from all the senders and recipients serviced by the trusted communications controller 302. This enables the activity monitor 314 to base decisions (e.g., denoting a sender as suspicious) on the recorded communications. For example, if a particular sender has many trust validation requests denied, the activity monitor 314 might flag the sender as suspicious. Accordingly, the trust determination unit 306 can be configured to handle future requests from the suspicious sender in a different way. For example, the trust determination unit 306 may block trust validation requests and discard Future communications from the suspicious sender. As another example, the trust determination unit 306 may close a communication account associated with the suspicious sender.

The recipient 320 receives communications from the sender 330 after the trust determination unit 306 validates the sender 330 based on the trust relationship map 318 and/or the trust establishment information provided by the sender. The trusted communications controller plug-in 322 may be implemented on the recipient's communication application 326. For example, the recipient 320 may be a mobile phone, the trusted communications controller plug-in 322 may be an application installed on a mobile phone to facilitate receiving trusted messages, and the communication application 326 may be a text-messaging module. The trust request inbox 324 stores a list of trust validation requests received by the recipient 320 from the trusted communications controller 302. After the recipient 320 accepts the trust validation request, the communication router 304 transmits the communication to the recipient's communication inbox 328.

The recipient 320 can also request, via the trusted communications controller plug-in 322, a list of trusted and blocked senders. The recipient 320 can manually revoke trust to a trusted sender and modify the trust information, trust policy, and other details stored in the user registry 316. The recipient 320 can also update a trust policy (e.g., trust levels) to be applied by the trust determination unit 306 to determine if a trust validation request is valid. For example, the trust policy may dictate how much and what type of information the sender 330 should provide to initiate a trust validation request.

In some embodiments, the trust determination unit 306 may communicate with one or more data stores (e.g., the denied relationship map 310, the trust establishment list 312, the activity monitor 314, the user registry 316, and the trust relationship map 318, etc.) that comprise the trusted communications controller 302. For example, the trust determination unit 306 can request and receive information from one or more of the data stores and accordingly discard or transmit communication to the recipient 320. Also, the trust determination unit 306 may access information in the data stores but may not directly modify the information in the data stores. For example, the trust determination unit 306 may direct a "data modification unit" (not shown) to update a trust relationship in the trust relationship map 310. The trust determination unit 306 may access the trust relationship map 310, identify a trust relationship between the sender 330 and the recipient 320, and accordingly transmit the sender's communications to the recipient 320.

Figure 4:
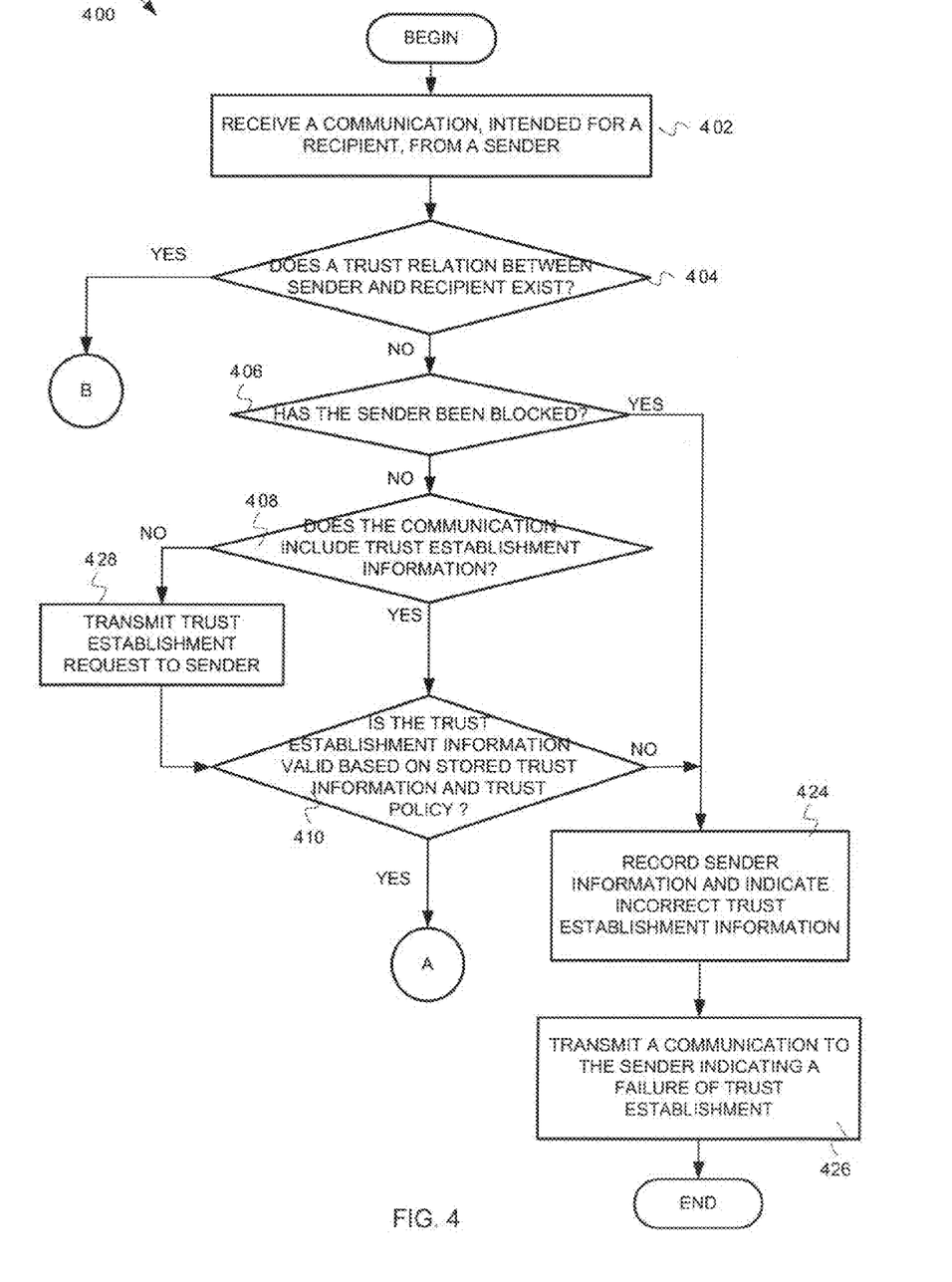
FIG. 4 is a flow diagram illustrating example operations for establishing trust between a sender and a recipient.
Figure 5:
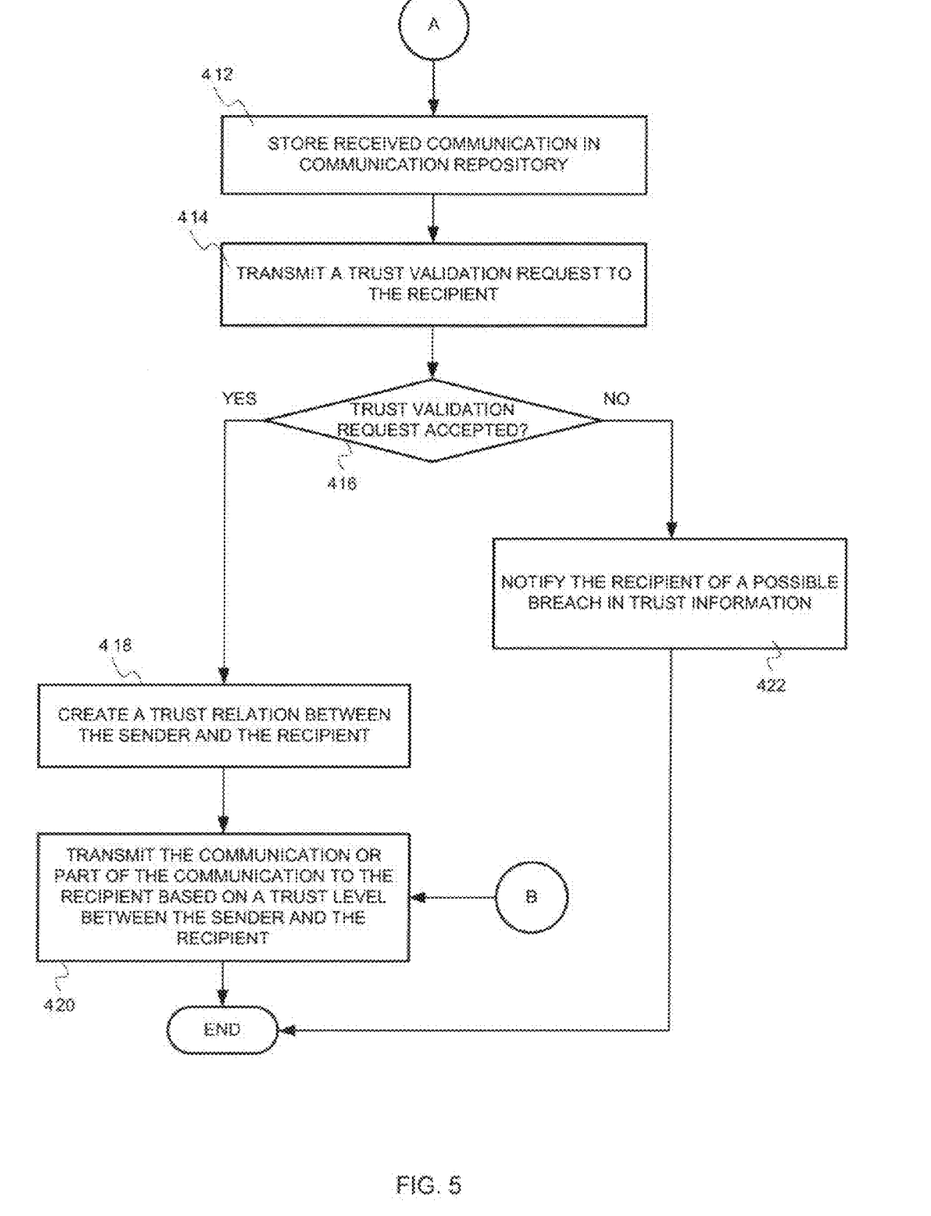
FIG. 5 is a flow diagram illustrating example operations for establishing trust between a sender and a recipient.

FIG. 4 and FIG. 5 are flow diagrams illustrating example operations for establishing trust between a sender and a recipient. The flow 400 begins at block 402 in FIG. 4.

At block 402, a communication intended for a recipient is received from a sender. The communication may be a text message, an instant message, an SMS, a paging message, a voice over Internet Protocol (VOIP) communication, an email message, etc. The received communication may or may not include trust establishment information about the recipient. In some implementations, a communication request containing trust establishment information, the sender's contact information, etc. may be received prior to actual communication between the sender and the recipient. The flow continues at block 404.

At block 404, it is determined whether a trust relation exists between the sender and the recipient. A trust relationship map (e.g., the trust relationship map 318 of FIG. 3) may be accessed to determine whether there exists a trust relation between the sender and the recipient. The trust relationship map 318 is a many-to-many mapping between a plurality of senders and a plurality of recipients. A trust relation between the sender and the recipient in the trust relationship map 318 indicates that communication from the sender should be transmitted to the recipient without further verification of trust establishment information. If it is determined, that a trust relation does not exist between the sender and the recipient, the flow continues at block 406. Otherwise, the flow continues at block 420 in FIG. 5 (denoted by connector B).

At block 406, it is determined whether the sender has been blocked. A denied relationship map (e.g., the denied relationship map 310 of FIG. 3) may be accessed to determine whether there exists a rejected trust relation between the sender and the recipient. If it is determined that the recipient has blocked the sender, the flow continues at block 424. Otherwise, tie flow continues at block 408.

At block 408, it is determined whether the communication received from the sender includes trust establishment information about the recipient. The received communication may include trust establishment information as part of the communication (e.g., appended before/after an SMS). In some implementations, the trust establishment information may be transmitted as part of the communication's header. For example, in transmitting a mobile phone voice communication, the trust establishment information may be included in a header associated with the voice communication. In other implementations, the sender may not transmit trust establishment information along with the communication. If it is determined that the received communication includes trust establishment information, the flow continues at block 410. Otherwise, the flow continues at block 428.

At block 428, a trust establishment request is transmitted to the sender. The trust establishment request can comprise a list of questions designed to judge the sender's knowledge of the recipient and determine a trust level that may be associated with the sender. The trust establishment request may be based on trust information configured by the recipient. The trust establishment request can comprise a list of questions based on a general knowledge of the recipient. For example, the trust establishment request may include questions such as, "What is the recipient's middle name", "What is the recipient's home address", "What was the color and model of the recipient's first car", etc. The trust establishment request may also prompt the sender to enter a secret code or password. The recipient may provide authorized senders with the password if the recipient anticipates receiving communications from the authorized senders. The trust establishment request may be transmitted to the sender in a separate communication or may be displayed as soon as the sender initiates the communication (e.g., presses the "call" button, etc). For example, after a sender presses a "call" button on a mobile phone, the sender may receive a pre-recorded voice message prompting the sender to key in a password. If the password is valid, a communication channel between the sender and recipient may be set up. The flow continues at block 410.

At block 410, it is determined whether the trust establishment information received from the sender is valid. The validity of the trust establishment information may be determined by comparing the received trust establishment information with trust information previously configured by the recipient. The received trust establishment information may also be used to determine a trust level associated with the sender based on the accuracy of the received trust establishment information and a trust policy. For example, according to the trust policy, voice communications via mobile phones and VOIP may be allowed only if all the trust establishment information is accurate. As another example, a trust validation request may be transmitted to the recipient if more than 70% of the trust establishment information is accurate. Recipients with multiple communication devices can also configure different a trust policy for each communication device. For example, a recipient can have a permissive trust policy for a mobile phone used at work, allowing any sender with knowledge of the recipient's full name to contact the recipient. On the other hand, the recipient may enforce a restrictive trust policy for a personal mobile phone, allowing a sender to contact the recipient only if the sender has knowledge of a secret code. The recipient may also configure trust policy based on a number of the communication's target recipients. For example, the recipient may indicate that communication from a sender should be discarded if the sender has sent the same communication to more than five other recipients. If it is determined that the trust establishment information is valid, a trust level associated with the sender is identified, and the flow continues at block 412 in FIG. 5 (denoted by connector A). Otherwise, the flow continues at block 424.

At block 412, the received communication is stored in a communication repository. The received communication is stored to prevent potential spam and unwanted communication from being transmitted to the recipient. The received communication is transmitted to the recipient after the recipient indicates that the sender is trusted. The flow continues at block 414.

At block 414, a trust validation request is transmitted to the recipient. The trust validation request may be transmitted to the recipient to give the recipient an option of accepting or rejecting the sender irrespective of the accuracy of the trust establishment information provided by the sender. In some implementations, the trust validation request may be sent to the recipient only if all the received trust establishment information is accurate. In another implementation, the trust validation request may be transmitted to the recipient if a part of the trust establishment information (e.g., more than 50% of the trust establishment information) is accurate. The flow continues at block 416.

At block 416, it is determined whether the trust validation request is accepted. The recipient may accept or reject the trust validation request based on the recipient's knowledge of the sender. For example, the recipient may reject the sender's trust validation request if the sender is a friend but is known to send transmit a large volume of unwanted communications. If it is determined that the recipient trusts the sender, the flow continues at block 418. Otherwise, the flow continues at block 422.

At block 418, a trust relation is created between the sender and the recipient. The trust relation between the sender and the recipient may be indicated in the trust relationship map. In some implementations, any further communications received from the sender may be directly transmitted to the recipient, without requiring the sender to provide trust establishment information. In other implementations, the sender may be required to provide trust establishment information even after a trust relation between the sender and the recipient has been established. The communication may be transmitted to the recipient if the provided trust establishment information is accurate. The flow continues at block 420.

At block 420, the communication stored in the communication repository is transmitted to the recipient. The communication or part of the communication may be transmitted to the recipient based on a level of trust associated with the sender. The trust level associated with the sender may be determined based on the accuracy of the trust establishment information received from the sender. For example, if only a part of the received trust establishment information was correct, SMS communication may be transmitted. However, MMS communication (e.g., videos, images, etc.) may not be transmitted to the recipient's mobile phone. From block 420, the flow ends. At block 422, the recipient is notified of a possible beach in stored trust information and is prompted to modify the stored trust information. This can prevent unauthorized senders with knowledge of the recipient's trust information (e.g., obtained by hacking trust information, randomly generating mobile phone numbers, etc.) from communicating with the recipient. From block 422, the flow ends.

At block 424, the sender's information is recorded and it is indicated that incorrect trust establishment information was provided. The flow 400 moves from block 410 to block 424 after it is determined that the trust establishment information provided by the sender is inaccurate. The sender may be added to a denied relationship list. Future communications from the sender and trust validation requests transmitted on behalf of the sender may be monitored. If the sender transmits more than an allowable number of communications, the sender may be prohibited from transmitting any further communications. In some implementations, the sender's communication account may be closed if more than a pre-defined number of recipients reject the sender's trust validation requests. The flow continues at block 426.

At block 426, a message indicating a failure of trust establishment is transmitted to the sender. From block 426, the flow ends.

It should be noted that the flow diagrams described in FIGS. 4-5 are examples meant to aid in understanding embodiments and should not be used to limit embodiments or limit scope of the claims. Embodiments may perform additional operations, fewer operations, operations in a different order, operations in parallel, and some operations differently. For example, in some implementations, a communication may not be received at block 402. Instead, a communication request including trust establishment information may be received from the sender. The sender may transmit the communication only after the sender receives notification of an accepted trust validation request. As another example, a trust level associated with each sender may be determined based on a percentage of accurate trust establishment information provided by the sender. The sender's trust level may be indicated as part of the trust establishment map. Also, a trust relationship between a first user and a second user does not imply a trust relationship between the second user and the first user. For example, the first user may receive communications from the second user but the second user may block communications from the first user. Thus, if the recipient wants to communicate with the sender, the operations described in FIGS. 4-5 are performed on behalf of the recipient. Also, in some implementations, the received communication may also contain information about the sender's identity. The communications may be discarded based on the authenticity of the sender's information and on the ability to verify the sender's information.

In some implementations, the flow 400 may not comprise operations for transmitting a trust establishment request to the sender (see block 428). Instead, the flow 400 may end after it is determined that the received communication does not comprise trust establishment information. In some implementations, the sender may receive the trust establishment request but may not respond to the trust establishment request (e.g., by not transmitting the trust establishment information), thus bringing the flow 400 to an end.

Figure 6:
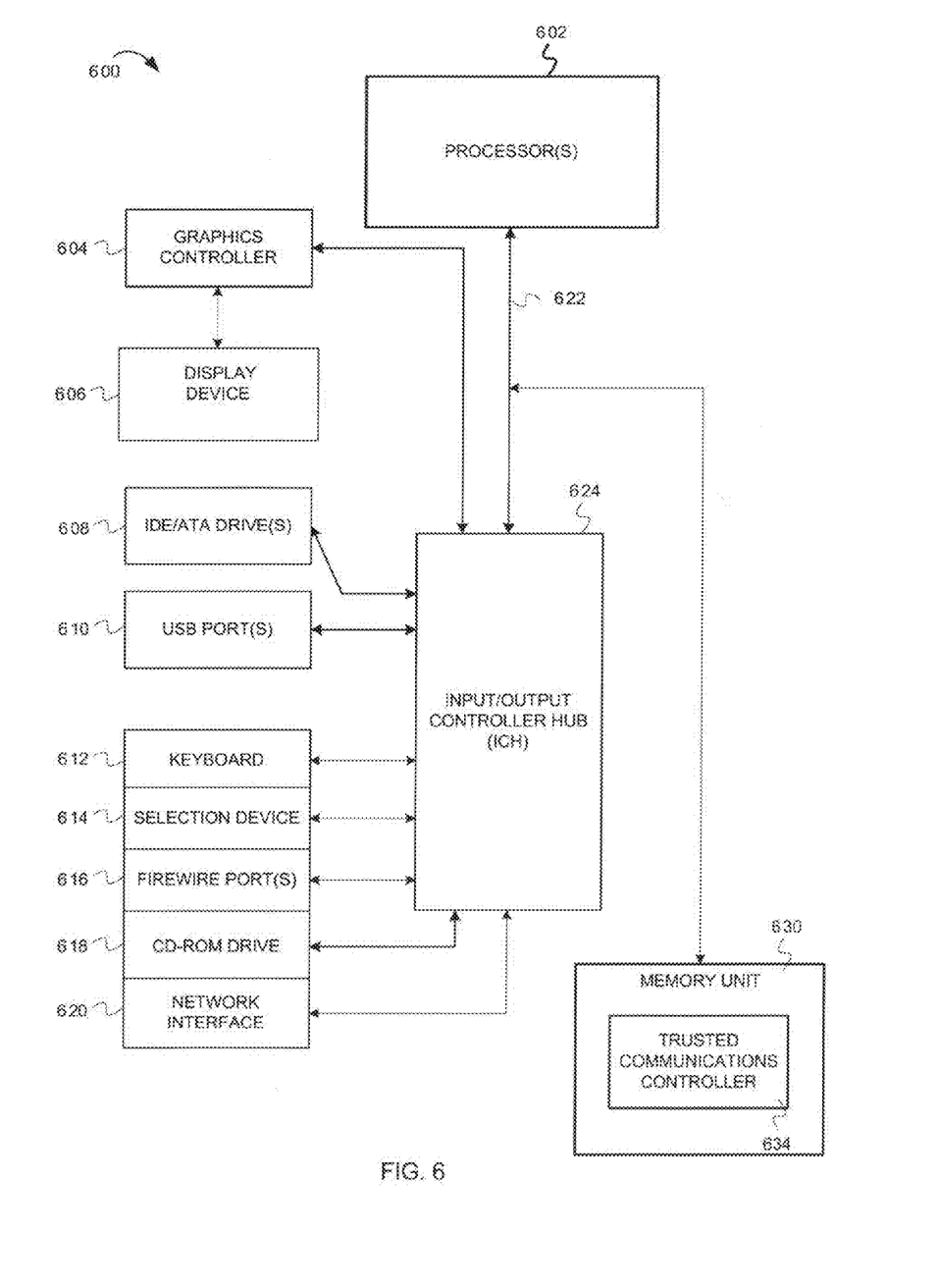
FIG. 6 is an example block diagram of a computer system configured to enable communication between a recipient and a trusted sender.

FIG. 6 is an example block diagram of a computer system 600 configured to enable communication between a recipient and a trusted sender. The computer system 600 includes a processor 602. The processor 602 is connected to an input/output controller hub 624 (ICH), also known as a south bridge, via a bus 622 (e.g., PCI, ISA, PCI-Express, HyperTransport, etc). A memory unit 630 interfaces with the processor 602 and the ICH 624. The main memory unit 630 can include any suitable random access memory (RAM), such as static RAM, dynamic RAM, synchronous dynamic RAM, extended data output RAM, etc.

The memory unit 630 embodies functionality to establish trust between a sender and a recipient and facilitate transmission of trusted communications. The memory unit 630 includes trusted communications controller 634. The trusted communications controller 634 intercepts communications from a sender, and retrieves trust establishment information from the sender about the recipient. The trust establishment information may be part of the communications or may be received in response to a trust establishment request sent by the trusted communications controller 634 in an attempt to establish a trust relation between the sender and the recipient. The trusted communications controller 634 compares the received trust establishment information with a pre-configured set of trust information and determines whether the received trust establishment information is acceptable (e.g., is above a pre-determined level of accuracy). The trusted communications controller 634 then transmits a trust validation request to the recipient allowing the recipient to accept or reject the sender's communications. If the recipient accepts the trust validation request, the trusted communications controller 634 also modifies a trust relationship map to indicate a trust relation between the sender and the recipient. The trusted communications controller 634 also transmits, to the recipient, the received communication and all further communications from the sender without further request for trust establishment information. If the recipient rejects the trust validation request, the trusted communications controller 634 adds a denied relation between the sender and the recipient in a denied relationship map. The trusted communications controller 634 also implements functionality to monitor activity between various users in the system (e.g., the system of FIG.

Figure 7:
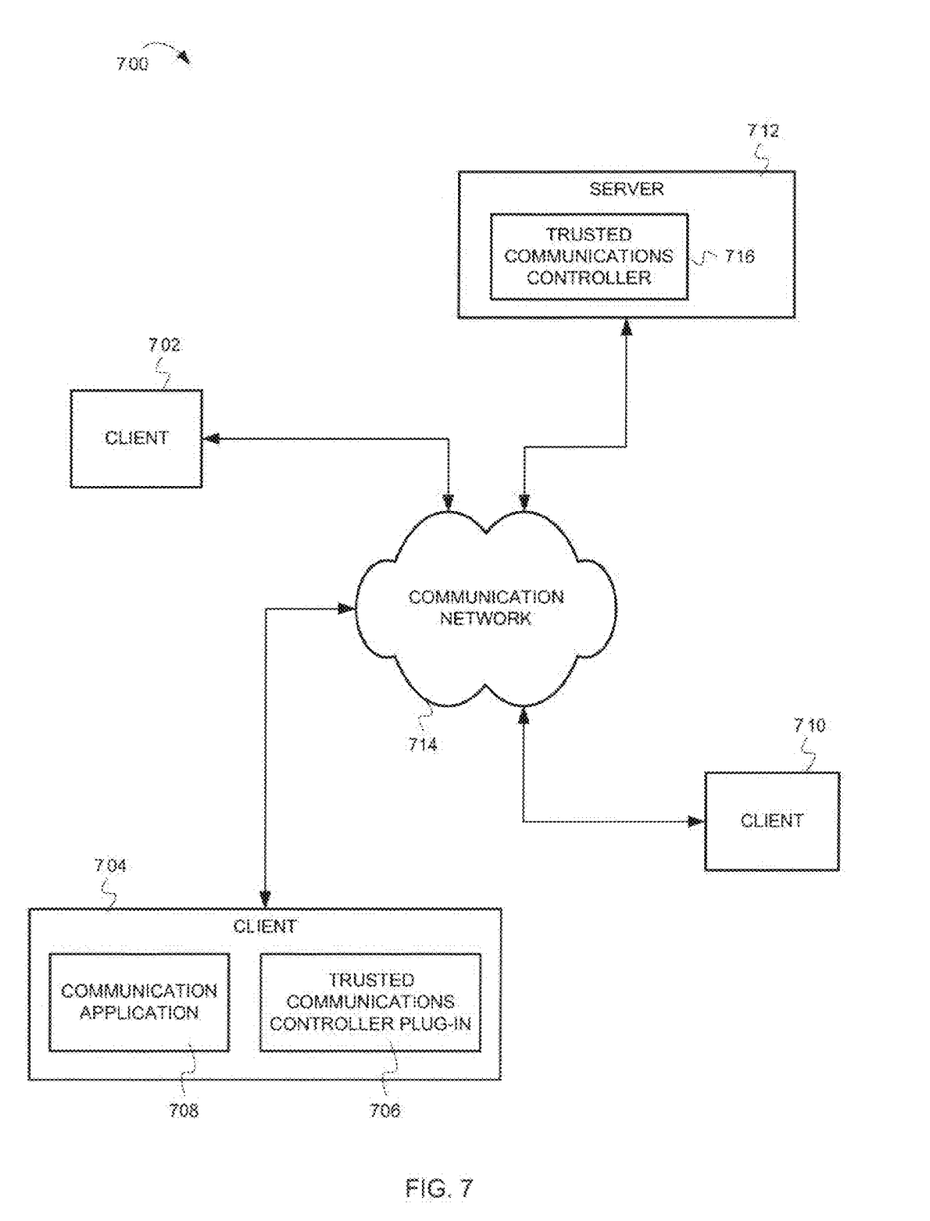
FIG. 7 is an example block diagram of a system configured to establish trust relations and facilitate communications between trusted clients.

7) and take appropriate action (e.g., block communication, close communication account, etc.) against suspicious senders.

The ICH 624 connects and controls peripheral devices. In FIG. 6, the ICH 624 is connected to IDE/ATA drives 608 (used to connect external storage devices) and to universal serial bus (USB) ports 610. The ICH 624 may also be connected to a keyboard 612, a selection device 614, firewire ports 616 (for use with video equipment), CD-ROM drive 618, and a network interface 620. The ICH 624 can also be connected to a graphics controller 604. The graphics controller is connected to a display device (e.g., monitor). In some embodiments, the computer system 600 can include additional devices and/or more than one of each component shown in FIG. 6 (e.g., video cards, audio cards, peripheral devices, etc.). For example, in some instances, the computer system 600 may include multiple processors, multiple cores, multiple external CPU's. In other instances, components may be integrated or subdivided.

FIG. 7 is an example block diagram of a system 700 configured to establish trust relations and facilitate communications between trusted clients. As shown in FIG. 7, the system 700 comprises a server 712 and clients 702, 704 and 710. The server 712 comprises a trusted communications controller 716. Each of the clients 702, 704, and 710 comprise a communication application 708 and a trusted communications controller plug-in 706.

The trusted communications controller 716 in the server 712 implements functionality to establish trust and provide trusted communications between the clients 702, 704, and 710 as described in accordance with FIGS. 1-6. The trusted communications controller 716 establishes trust between clients—a sender and a recipient, by requesting trust establishment information from the sender. If the trust establishment information satisfies a pre-defined level of accuracy, the trusted communications controller 716 sends a trust validation request to the recipient. After the recipient accepts the trust validation request, the trusted communications controller 716 indicates a trust relation in a trust relationship map and transmits all further communications from the sender to the recipient.

The sender (e.g., client 704) generates a communication using the communication application 708. For example, if the client 704 is a mobile phone, the communication application 708 may be a text-messaging module to send an SMS. As another example, the communication application 708 may also be a module (triggered by a pressing of a "call" button) for initiating a voice call in a mobile phone. The trusted communications controller plug-in 706 acts as an interface between the client's communication application 708 and the sender's trusted communications controller 716. The trusted communications controller plug-in 706 can determine whether the communications contain trust establishment information, prompt the sender to provide trust establishment information, store a list of recipients with whom the sender has a trusted relationship, etc.

The server 712 and the wireless devices 702,704, and 710 are connected to a communication network 714. The communication network 714 can include any technology suitable for passing communication between the clients and servers (e.g., Ethernet, 802.11n, SONET, etc.). Moreover, the communication network 714 can be part of other networks, such as cellular telephone networks, public-switched telephone networks (PSTN), cable television networks, etc. Additionally, the server 712 and wireless devices (e.g., 704) can be any suitable computing devices capable of executing software in accordance with the embodiments described herein. For example, the clients (i.e., senders and recipients) can be any one of mobile phones, pagers, personal digital assistants, laptops, VOIP phones, landline phones, etc. The server may be embodied as an example computer system illustrated in FIG. 6.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for providing trusted communications as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method comprising:
receiving a communication request from a sender, wherein the communication request comprises trust establishment information and precedes a first communication between the sender and a first recipient;
storing the first communication in a communication repository;
determining that a trust relationship between the sender and the first recipient is not indicated in a trust relationship map, wherein the trust relationship map indicates trust relationships between a plurality of senders and recipients whose communications pass through a communications server;
comparing the trust establishment information in the communication request with a stored set of trust information configured by the first recipient;
determining that the trust establishment information in the communication request is correct;
transmitting, to the first recipient, a trust validation request to determine whether to send the stored first communication to the first recipient, wherein the trust validation request indicates, at least, the trust establishment information in the communication request;
receiving, from the first recipient, a response to the trust validation request, wherein the response indicates an acceptance of the trust validation request;
generating a relationship mapping between the sender and the first recipient in the trust relationship map; and
transmitting the stored first communication to the first recipient.

2. The method of claim 1, wherein the first communication is a mobile phone voice communication, and wherein the sender is identified by a sender mobile phone number and the first recipient is identified by a recipient mobile phone number.

3. The method of claim 1, comprising:
receiving a second communication, intended for the first recipient, from the sender;
determining that a trust relationship between the sender and the first recipient is indicated in the trust relationship map; and
transmitting the second communication from the sender to the first recipient.

4. The method of claim 3, wherein the transmitting the second communication from the sender to the first recipient further comprises either one of determining that trust establishment information in a header associated with the second communication is accurate in accordance with the stored set of trust information prior to said transmitting the second communication from the sender to the first recipient and transmitting the second communication from the sender to the first recipient without verification of the trust establishment information.

5. The method of claim 1, further comprising:
determining that a number of communications transmitted by the sender exceeds an allowable number of transmitted communications; and
closing a communication account associated with the sender.

6. The method of claim 1, wherein the first recipient configures one or more trust levels based, at least in part, on the stored set of trust establishment information.

7. The method of claim 6, further comprising:
generating a trust establishment request in response to the communication request received from the sender, wherein the trust establishment request is transmitted to the sender to verify the authenticity of the sender, and wherein the trust establishment request comprises a set of one or more trust questions based on the stored set of trust information;
determining a number of correct responses to the set of one or more trust questions in the trust establishment request based on receiving, from the sender, a response to the trust establishment request; and
associating a trust level of the one or more trust levels based, at least in part, on the determining the number of correct responses to the set of one or more trust questions in the trust establishment request.

8. The method of claim 1, further comprising:
receiving a third communication for a second recipient, from the sender, wherein the third communication comprises multimedia content;
determining that a trust relationship between the sender and the second recipient is indicated in the trust relationship map;
determining a low level of trust associated with the sender based on a trust policy configured by the second recipient; and
transmitting the third communication to the second recipient without multimedia content based on the determining a low level of trust associated with the sender based on a trust policy configured by the second recipient.

9. A computer-implemented method comprising:
receiving a communication request from a sender, wherein the communication request comprises trust establishment information and precedes a first communication between the sender and a first recipient;
storing the first communication in a communication repository;
determining that a trust relationship between the sender and the first recipient is not indicated in a trust relationship map, wherein the trust relationship map indicates trust relationships between a plurality of senders and recipients whose communications pass through a communications server;
comparing the trust establishment information in the communication request with a stored set of trust information configured by the first recipient;
determining that the trust establishment information in the communication request is correct; and
transmitting, to the first recipient, a trust validation request to determine whether to send the stored first communication to the first recipient, wherein the trust validation request indicates, at least, the trust establishment information in the communication request
receiving, from the first recipient, a response to the trust validation request, wherein the response indicates a rejection of the trust validation request;
notifying the first recipient of a breach in trust establishment information; and
generating a relationship mapping between the sender and the first recipient in a denied relationship map, wherein the denied relationship map indicates rejected trust validation requests between the plurality of senders and recipients whose communications pass through the communications server.

10. A computer-implemented method comprising:
receiving a first communication transmitted by a sender to a recipient, wherein the first communication comprises trust establishment information;
determining that a trust relationship between the sender and the recipient is not indicated in a trust relationship map, wherein the trust relationship map indicates trust relationships between a plurality of senders and recipients whose communications pass through a communications server;
comparing the trust establishment information in the first communication with a stored set of trust information configured by the recipient;
determining that the trust establishment information in the first communication is incorrect; and
generating a relationship mapping between the sender and the recipient in a denied relationship map, wherein the denied relationship map indicates rejected trust validation requests between the plurality of senders and recipients whose communications pass through the communications server.

11. The method of claim 10, further comprising:
receiving a second communication transmitted by the sender to the recipient;
determining that there exists a relationship between the sender and the recipient in the denied relationship map; and
preventing the second communication from being transmitted to the recipient.

12. The method of claim 10, wherein the first communication is one of a short messaging services communication, a voice over internet protocol communication, an instant message, a multimedia messaging service communication, and a mobile phone voice communication.

13. The method of claim 10, further comprising:
monitoring a transfer of communication between the server and at least one of the sender and the recipient;
determining that the sender is suspicious, based at least in part, on the monitored transfer of communication between the server and the sender; and
preventing the sender from transmitting communications to the plurality of recipients.

14. The method of claim 13, wherein the determining that the sender is suspicious comprises one or more of determining that a number of communication requests transmitted by the sender exceeds a maximum allowable limit, determining that trust validation requests sent to one or more recipients are rejected, determining that a number of communications transmitted within a pre-defined time exceeds a maximum allowable limit, and determining that the sender simultaneously transmits a communication to a large number of recipients.

15. A computer program product for providing trusted communication, the computer program product comprising:
a computer storage medium having computer usable program code embodied therewith, the computer usable program code comprising:
computer usable program code configured to:
receive a communication request from a sender, wherein the communication request comprises trust establishment information and precedes a first communication between the sender and a first recipient;
store the first communication in a communication repository;
determine that a trust relationship between the sender and the first recipient is not indicated in a trust relationship map, wherein the trust relationship map indicates trust relationships between a plurality of senders and recipients whose communications pass through a communications server;
compare the trust establishment information in the communication request with a stored set of trust information configured by the first recipient;
determine that the trust establishment information in the communication request is correct;
transmit, to the first recipient, a trust validation request to determine whether to send the stored first communication to the first recipient, wherein the trust validation request indicates, at least, the trust establishment information in the communication request
receiving, from the first recipient, a response to the trust validation request, wherein the response indicates an acceptance of the trust validation request;
generating a relationship mapping between the sender and the first recipient in the trust relationship map; and
transmitting the stored first communication to the first recipient.

16. The computer program product of claim 15, wherein the computer usable program code is further configured to:
receive a second communication for a second recipient, from the sender, wherein the second communication comprises multimedia content;
determine that a trust relationship between the sender and the second recipient is indicated in the trust relationship map;
determine a low level of trust associated with the sender based on a trust policy configured by the second recipient; and
transmit the second communication to the second recipient without multimedia content based on the determining a low level of trust associated with the sender based on a trust policy configured by the second recipient.

17. A computer program product for providing trusted communication, the computer program product comprising:
a computer storage medium having computer usable program code embodied therewith, the computer usable program code comprising:
computer usable program code configured to:
receive a communication request from a sender, wherein the communication request comprises trust establishment information and precedes a first communication between the sender and a first recipient;
store the first communication in a communication repository;
determine that a trust relationship between the sender and the first recipient is not indicated in a trust relationship map, wherein the trust relationship map indicates trust relationships between a plurality of senders and recipients whose communications pass through a communications server;
compare the trust establishment information in the communication request with a stored set of trust information configured by the first recipient;
determine that the trust establishment information in the communication request is correct;
transmit, to the first recipient, a trust validation request to determine whether to send the stored first communication to the first recipient, wherein the trust validation request indicates, at least, the trust establishment information in the communication request receive, from the first recipient, a response to the trust validation request, wherein the response indicates a rejection of the trust validation request;
notify the first recipient of a breach in trust establishment information; and
generate a relationship mapping between the sender and the first recipient in a denied relationship map, wherein the denied relationship map indicates rejected trust validation requests between the plurality of senders and recipients whose communications pass through the communications server.

18. An apparatus comprising:
a set of one or more processor units;
a memory unit coupled to the set of one or more processor units; and
a trusted communications controller configured to establish trust relationships and provide trusted communications between a plurality of senders and a plurality of recipients, the trusted communications controller comprising:
   a communication repository configured to store communications between the plurality of senders and the plurality of recipients;
   a user registry configured to store trust information and trust policy configured by the plurality of recipients; and
   an activity monitor configured to monitor transfer of communications between the trusted communications provider and at least one of a sender of the plurality of senders and a recipient of the plurality of recipients; and
   a trust determination unit configured to
      receive a communication request from a sender, wherein the communication request comprises trust establishment information and precedes a communication between the sender and a recipient;
      store the communication in the communication repository;
      determine that a trust relationship between the sender and the recipient is not indicated in a trust relationship map, wherein the trust relationship map indicates trust relationships between the plurality of senders and recipients;
      compare the trust establishment information in the communication request with a stored set of trust information in the user registry configured by the recipient;
      determine that the trust establishment information in the communication request is correct;
   transmit, to the recipient, a trust validation request to determine whether to send the stored communication to the recipient, wherein the trust validation request indicates, at least, the trust establishment information in the communication request;
   receiving, from the first recipient, a response to the trust validation request, wherein the response indicates an acceptance of the trust validation request;
   generating a relationship mapping between the sender and the first recipient in the trust relationship map; and
   transmitting the stored first communication to the first recipient.

19. An apparatus comprising:
a set of one or more processor units;
a memory unit coupled to the set of one or more processor units; and
a trusted communications controller configured to establish trust relationships and provide trusted communications between a plurality of senders and a plurality of recipients, the trusted communications controller comprising:
   a communication repository configured to store communications between the plurality of senders and the plurality of recipients;
   a user registry configured to store trust information and trust policy configured by the plurality of recipients; and
   an activity monitor configured to monitor transfer of communications between the trusted communications provider and at least one of a sender of the plurality of senders and a recipient of the plurality of recipients; and
   a trust determination unit configured to
      receive a communication request from a sender, wherein the communication request comprises trust establishment information and precedes a communication between the sender and a recipient;
      store the communication in the communication repository;
      determine that a trust relationship between the sender and the recipient is not indicated in a trust relationship map, wherein the trust relationship map indicates trust relationships between the plurality of senders and recipients;
      compare the trust establishment information in the communication request with a stored set of trust information in the user registry configured by the recipient;
      determine that the trust establishment information in the communication request is correct; and
   transmit, to the recipient, a trust validation request to determine whether to send the stored communication to the recipient, wherein the trust validation request indicates, at least, the trust establishment information in the communication request.
the trust determination unit configured to
   receive, from the first recipient, a response to the trust validation request, wherein the response indicates an acceptance of the trust validation request;
   generate a relationship mapping between the sender and the first recipient in the trust relationship map; and
   transmit the stored first communication to the first recipient.

* * * * *